United States Patent
Connors et al.

(10) Patent No.: US 8,526,366 B2
(45) Date of Patent: *Sep. 3, 2013

(54) METHOD AND APPARATUS FOR A SCHEDULER FOR A MACRO-DIVERSITY PORTION OF A TRANSMISSION

(75) Inventors: Dennis P. Connors, San Diego, CA (US); Huei-Jiun Ju, San Diego, CA (US); Keerthi S. Govind, San Diego, CA (US); Sina Zahedi, San Diego, CA (US)

(73) Assignee: Wi-Lan, Inc., Ottawa (CA)

( * ) Notice: Subject to any disclaimer, the term of this patent is extended or adjusted under 35 U.S.C. 154(b) by 184 days.

This patent is subject to a terminal disclaimer.

(21) Appl. No.: 13/043,193

(22) Filed: Mar. 8, 2011

(65) Prior Publication Data

US 2011/0286435 A1    Nov. 24, 2011

Related U.S. Application Data

(63) Continuation of application No. 11/933,987, filed on Nov. 1, 2007, now Pat. No. 7,903,604.

(60) Provisional application No. 60/912,661, filed on Apr. 18, 2007, provisional application No. 60/913,172, filed on Apr. 20, 2007, provisional application No. 60/953,452, filed on Aug. 1, 2007, provisional application No. 60/971,837, filed on Sep. 12, 2007.

(51) Int. Cl.
*H04W 4/00*       (2009.01)
(52) U.S. Cl.
USPC ............ 370/328; 370/345; 370/442; 370/478
(58) Field of Classification Search
None
See application file for complete search history.

(56) References Cited

U.S. PATENT DOCUMENTS

| | | | |
|---|---|---|---|
| 5,452,288 | A | 9/1995 | Rahuel et al. |
| 5,544,198 | A | 8/1996 | Saalfrank et al. |
| 5,659,685 | A | 8/1997 | Williams et al. |
| 5,740,534 | A | 4/1998 | Ayerst et al. |

(Continued)

FOREIGN PATENT DOCUMENTS

| | | |
|---|---|---|
| EP | 1 237 371 | 9/2002 |
| EP | 1 594 330 | 11/2005 |

(Continued)

OTHER PUBLICATIONS

IEEE Standard for Local and metropolitan area networks, Part 16: Interface for Fixed Broadband Wireless Access Systems, IEEE Computer Society and the IEEE Microwave Theory and Techniques Society, IEEE Std. 802.16 (Oct. 1, 2004).

(Continued)

*Primary Examiner* — Bob Phunkulh
(74) *Attorney, Agent, or Firm* — Volpe and Koenig, P.C.

(57) ABSTRACT

A method, apparatuses, and system of broadcasting content data in a macro-diversity region of a data frame includes receiving a stream of transport packets. Selecting at least one burst size, from amongst a set of a plurality of predetermined burst sizes. Allocating one or more data bursts with the selected burst size to the macro-diversity region of the data frame, each data burst comprising at least a portion of the received transport packets and wherein the at least one burst size is selected so as to minimize a number of data bursts allocated to the macro-diversity region. Then communicating the allocation of data bursts to a transmitter that includes the allocation of data bursts in the macro-diversity region of a data frame transmitted by the transmitter.

15 Claims, 8 Drawing Sheets

(56) References Cited

U.S. PATENT DOCUMENTS

| | | |
|---|---|---|
| 5,867,791 A | 2/1999 | Chambert |
| 5,892,910 A | 4/1999 | Safadi |
| 6,009,325 A | 12/1999 | Retzer et al. |
| 6,112,100 A | 8/2000 | Ossoinig et al. |
| 6,172,988 B1 | 1/2001 | Tiernan et al. |
| 6,192,038 B1 | 2/2001 | Wallerius et al. |
| 6,212,190 B1 | 4/2001 | Mulligan et al. |
| 6,502,131 B1 | 12/2002 | Vaid et al. |
| 6,628,638 B1 | 9/2003 | Sato et al. |
| 6,721,797 B1 | 4/2004 | Kim |
| 6,847,826 B1 | 1/2005 | Wesby et al. |
| 6,898,640 B1 | 5/2005 | Kurita et al. |
| 7,035,215 B1 | 4/2006 | Engdahl |
| 7,058,407 B2 | 6/2006 | Chi et al. |
| 7,099,348 B1 | 8/2006 | Warwick et al. |
| 7,107,061 B1 | 9/2006 | Tontiruttananon et al. |
| 7,242,960 B2 | 7/2007 | Van Rooyen |
| 7,283,817 B2 | 10/2007 | Salo et al. |
| 7,301,905 B1 | 11/2007 | Tontiruttananon et al. |
| 7,324,832 B2 | 1/2008 | Van Rooyen |
| 7,333,829 B2 | 2/2008 | Malone et al. |
| 7,362,735 B2 | 4/2008 | Mantha |
| 7,421,244 B2 | 9/2008 | Van Rooyen |
| 7,450,899 B2 | 11/2008 | Roberts et al. |
| 7,522,536 B2 | 4/2009 | Roberts et al. |
| 7,593,738 B2 | 9/2009 | Anderson |
| 7,599,327 B2 | 10/2009 | Zhuang |
| 7,613,104 B2 | 11/2009 | Bhatt et al. |
| 7,768,966 B2 | 8/2010 | Yoon et al. |
| 2001/0030956 A1 | 10/2001 | Chillariga et al. |
| 2001/0046240 A1 | 11/2001 | Longoni et al. |
| 2002/0061012 A1 | 5/2002 | Thi et al. |
| 2002/0086691 A1 | 7/2002 | Kostic et al. |
| 2002/0138560 A1 | 9/2002 | Aaltonen et al. |
| 2002/0160784 A1 | 10/2002 | Kuwahara |
| 2002/0167962 A1 | 11/2002 | Kowalski |
| 2003/0002474 A1 | 1/2003 | Alexander et al. |
| 2003/0007225 A1 | 1/2003 | Hsieh et al. |
| 2003/0095513 A1 | 5/2003 | Woodmansee et al. |
| 2004/0017777 A1 | 1/2004 | Chaudhuri et al. |
| 2004/0141502 A1 | 7/2004 | Corson et al. |
| 2004/0153767 A1 | 8/2004 | Dolgonos |
| 2004/0223449 A1 | 11/2004 | Tsuie et al. |
| 2004/0229624 A1 | 11/2004 | Cai et al. |
| 2005/0090235 A1 | 4/2005 | Vermola et al. |
| 2005/0117070 A1 | 6/2005 | Wu et al. |
| 2005/0118946 A1 | 6/2005 | Colban et al. |
| 2005/0130661 A1 | 6/2005 | Aerrabotu et al. |
| 2005/0153650 A1 | 7/2005 | Hikomoto |
| 2005/0157735 A1 | 7/2005 | Kan et al. |
| 2005/0286408 A1 | 12/2005 | Jin et al. |
| 2006/0025079 A1 | 2/2006 | Sutskover et al. |
| 2006/0034250 A1 | 2/2006 | Kim et al. |
| 2006/0039285 A1 | 2/2006 | Chapman et al. |
| 2006/0079224 A1 | 4/2006 | Welnick et al. |
| 2006/0088023 A1 | 4/2006 | Muller |
| 2006/0128426 A1 | 6/2006 | Van Rooyen |
| 2006/0153132 A1 | 7/2006 | Saito |
| 2006/0153147 A1 | 7/2006 | Chillariga et al. |
| 2006/0153227 A1 | 7/2006 | Hwang et al. |
| 2006/0153232 A1 | 7/2006 | Shvodian |
| 2006/0193286 A1 | 8/2006 | Naghian et al. |
| 2006/0205406 A1 | 9/2006 | Pekonen et al. |
| 2006/0227718 A1 | 10/2006 | Wang et al. |
| 2006/0233359 A1 | 10/2006 | Jung et al. |
| 2006/0239264 A1 | 10/2006 | Kang et al. |
| 2006/0244865 A1 | 11/2006 | Simon |
| 2006/0246890 A1 | 11/2006 | Yasuda et al. |
| 2006/0262744 A1 | 11/2006 | Xu et al. |
| 2006/0262751 A1 | 11/2006 | Vermola et al. |
| 2006/0262793 A1 | 11/2006 | Vare et al. |
| 2006/0268673 A1 | 11/2006 | Roh et al. |
| 2006/0285508 A1 | 12/2006 | Vermola et al. |
| 2007/0026866 A1 | 2/2007 | Krishnamurthi et al. |
| 2007/0070180 A1 | 3/2007 | Van Rooven |
| 2007/0091857 A1 | 4/2007 | Elstermann |
| 2007/0165104 A1 | 7/2007 | Khan et al. |
| 2007/0165575 A1 | 7/2007 | Niwano |
| 2007/0167159 A1 | 7/2007 | Ramesh et al. |
| 2007/0171910 A1 | 7/2007 | Kumar |
| 2007/0223612 A1 | 9/2007 | Simon |
| 2007/0240188 A1 | 10/2007 | Vermola et al. |
| 2007/0249380 A1 | 10/2007 | Stewart et al. |
| 2007/0274253 A1 | 11/2007 | Zhang et al. |
| 2008/0008176 A1 | 1/2008 | Lim et al. |
| 2008/0037460 A1 | 2/2008 | Venkatachalam |
| 2008/0152018 A1 | 6/2008 | Ma et al. |
| 2008/0170529 A1 | 7/2008 | Connors et al. |
| 2008/0170530 A1 | 7/2008 | Connors et al. |
| 2008/0198785 A1 | 8/2008 | Huang et al. |
| 2008/0205322 A1 | 8/2008 | Cai et al. |
| 2008/0259813 A1 | 10/2008 | Matta et al. |
| 2008/0316943 A1 | 12/2008 | Mosker et al. |
| 2009/0028276 A1 | 1/2009 | Van Rooyen |
| 2009/0129334 A1 | 5/2009 | Ma et al. |
| 2009/0219909 A1 | 9/2009 | Ko et al. |
| 2009/0252070 A1 | 10/2009 | Connors et al. |
| 2010/0020686 A1 | 1/2010 | Lee et al. |
| 2010/0077173 A1 | 3/2010 | Rao et al. |
| 2010/0177643 A1 | 7/2010 | Matta et al. |
| 2010/0241613 A1 | 9/2010 | Rao |
| 2013/0064253 A1 | 3/2013 | Helms et al. |

FOREIGN PATENT DOCUMENTS

| | | |
|---|---|---|
| JP | 2003-018108 | 1/2003 |
| JP | 2005-323112 | 11/2005 |
| JP | 2006-074500 | 3/2006 |
| JP | 2006-081171 | 3/2006 |
| KR | 2004-0000953 | 1/2004 |
| KR | 2005-0017046 | 2/2005 |
| WO | 01/50782 | 7/2001 |
| WO | 03/030451 | 4/2003 |
| WO | 03/081938 | 10/2003 |
| WO | 2006/047941 | 5/2006 |
| WO | 2006/099322 | 9/2006 |
| WO | 2006/105010 | 10/2006 |
| WO | 2006/138556 | 12/2006 |
| WO | 2007/010444 | 1/2007 |

OTHER PUBLICATIONS

Wang et al., "System Architecture and Cross-Layer Optimization of Video Broadcast over WiMAX," IEEE Journal in Selected Areas in Communication, vol. 25, No. 4, pp. 712-721 (May 2007).

Digital Video Broadcasting (DVB); Transmission System for Handheld Terminals (DVB-H), ETSI EN 302 304 V1.1.1 (Nov. 2004).

"Mobile WiMAX—Part 1: A Technical Overview and Performance Evaluation," WiMAX Forum, pp. 1-53 (Aug. 2006).

"Mobile WiMAX—Part II: A Comparitive Analysis," WiMAX Forum, pp. 1-47 (May 2006).

Faria et al., "DVB-H: Digital Broadcast Services to Handheld Devices," Proceedings of the IEEE, vol. 94, No. 1, pp. 194-209 (Jan. 2006).

IEEE Standard for Local and metropolitan area networks, Part 16: Air Interface for Fixed and Mobile Broadband Wireless Access Systems; Amendment 2: Physical and Medium Access Control Layers for Combined Fixed and Mobile Operation in Licensed Bands and Corrigendum 1, IEEE Computer Society and the IEEE Microwave Theory and Techniques Society, IEEE Std. 802.16e-2005 and IEEE Std. 802.16-2004/Cor1-2005 (Feb. 28, 2006).

IEEE Standard for Local and metropolitan area networks, Part 16: Interface for Fixed Broadband Wireless Access Systems, IEEE Computer Society and the IEEE Microwave Theory and Techniques Sociey, IEEE Std. 802.16 (Oct. 1, 2004).

International Search Report and Written Opinion for PCT/US2008/050365 mailed Sep. 4, 2008.

International Search Report and Written Opinion for PCT/US2008/057875 mailed Aug. 20, 2008.

International Search Report and Written Opinion for PCT/US2008/060518 issued Sep. 4, 2008.

International Search Report and Written Opinion for PCT/US2008/060517 mailed Aug. 27, 2008.
International Search Report/Written Opinion issued in PCT/US08/50500 on May 26, 2008.
International Search Report/Written Opinion issued in PCT/US08/50743 on May 13, 2008.
International Search Report/Written Opinion issued in PCT/US2008/057883 on Jul. 29, 2008.
International Search Report/Written Opinion issued in PCT/US2008/050719 on Jun. 24, 2008.
International Search Report/Written Opinion issued in PCT/US2008/050302 on Jul. 9, 2008.
Partial International Search Report issued in PCT/US2008/050369 on Jun. 26, 2008.
Qualcomm Corporation, "Flo Technology Brief," www.qualcomm.com/mediaflo (2005).
Qualcomm Corporation, "MediaFlo System," www.qualcomm.com/mediaflo (2005).
Qualcomm Corporation, "MediaFlo Technology Overview," www.qualcomm.com/mediaflo (2007).
Wang et al., "System Architecture and Cross-Layer Optimization of Video Broadcast over WiMAX," IEEE Journal on Selected Areas in Communication, vol. 25, No. 4, pp. 712-721 (May 2007).

METHOD AND APPARATUS FOR A SCHEDULER FOR A MACRO-DIVERSITY PORTION OF A TRANSMISSION

CROSS REFERENCE TO RELATED APPLICATIONS

This application is a Continuation of U.S. Non-Provisional application Ser. No. 11/933,987, filed Nov. 1, 2007, now U.S. Pat. No. 7,903,604, which claims the benefit of U.S. Provisional Patent Application No. 60/912,661, filed Apr. 18, 2007, U.S. Provisional Patent Application No. 60/913,172, filed Apr. 20, 2007, U.S. Provisional Patent Application No. 60/953,452, filed Aug. 1, 2007, and U.S. Provisional Patent Application No. 60/971,837 filed Sep. 12, 2007, which are hereby incorporated by reference in their entirety.

BACKGROUND

1. Field

This invention relates generally to a wireless communication system, and in particular to a wireless broadcast communication system.

2. Background

Wireless communication networks typically have a plurality of servicing base stations which receive and transmit signals to users' devices within the service area of the respective base stations. Communication between a user and their respective base station is maintained as a user moves about the network service area by handing off the user from one base station to another.

Many new services are being offered to customers of wireless communication carriers. One such service is providing customers with multimedia content via the wireless communication network. For example, it is desired to provide audio/video content to customers as they move about the network.

Providing multimedia content via wireless communication networks presents several challenges. For example, transmitting multimedia content typically consumes large amounts of a communication system's bandwidth. Limitations in the amount of bandwidth available in a communication system may limit the amount and variety of content that can be provided, or transmitted, by a communication system. Bandwidth constraints can also be compounded by the addition of overhead messages that may be included in signals transmitted by the communication system. For example, overhead messages may be added to a transmitted signal to provide error correction for the signal. Bandwidth constraints may limit the quality of the transmitted content due to insufficient bandwidth to support robust error correction schemes. The effect of bandwidth limitations on the communication system, such as limiting the variety and quality of the content available, may lead to dissatisfaction to the users.

Therefore, there is a need for improved systems, apparatus, and techniques for improving bandwidth utilization in communication systems that provide content, such as multimedia content, to users of the wireless communication network.

SUMMARY

The present invention includes methods, apparatuses, and systems as described in the written description and claims. In one embodiment, a method of broadcasting content data in a macro-diversity region of a data frame is provided. This method comprises receiving a stream of transport packets, selecting at least one burst size, from amongst a set of a plurality of predetermined burst sizes, allocating one or more data bursts with the selected burst size to the macro-diversity region of the data frame, each data burst comprising at least a portion of the received transport packets and wherein the at least one burst size is selected so as to minimize a number of data bursts allocated to the macro-diversity region, and communicating information regarding the allocation of data bursts to the macro-diversity region for broadcasting a data frame comprising the macro-diversity region from at least a first transmitter.

In another embodiment, a method of generating a macro-diversity region in a data frame is provided. This method comprises identifying a plurality of sub-channels and a plurality of symbol periods, wherein a symbol period comprises a plurality of symbols, and wherein each symbol during an individual symbol period is associated with a different one of the plurality of sub-channels; generating a map that includes information that describes data bursts and a size of a map in a subsequent macro-diversity region, wherein the map information is included in at least a first symbol during a first symbol period and wherein a data burst is included in at least a second symbol during the first symbol period.

In yet another embodiment, there is provided a method of broadcasting content data in a macro-diversity region of a data frame. This method comprises encapsulating a plurality of transport packets, each transport packet comprising content data; selecting at least one burst size, from amongst a set of a plurality of predetermined burst sizes, and allocating one or more data bursts with the selected burst size to the macro-diversity region of the data frame, each data burst comprising at least a portion of the encapsulated transport packets and wherein the at least one burst size is selected so as to minimize the number of data bursts allocated to the macro-diversity region; and broadcasting from each of at least a first and a second transmitter a signal including the data frame in which the at least one data burst was allocated, such that the signals broadcasted from the first and second transmitter are synchronized.

In yet another embodiment, there is provided a scheduler comprising means for receiving a stream of transport packets; means for selecting at least one burst size, from amongst a set of a plurality of predetermined burst sizes; means for allocating one or more data bursts with the selected burst size to the macro-diversity region of the data frame, each data burst comprising at least a portion of the received transport packets and wherein the at least one burst size is selected so as to minimize a number of data bursts allocated to the macro-diversity region; and means for communicating information regarding the allocation of data bursts to the macro-diversity region for broadcasting a data frame comprising the macro-diversity region from at least a first transmitter.

In yet another embodiment, there is provided a scheduler comprising an input that receives a plurality of data packets; a processor that selects a burst size from among a set of a plurality of predetermined burst sizes, the selected burst size being the largest burst size that fits within a non-allocated portion of a macro-diversity region of a data frame, allocates the selected burst size to the macro-diversity region of the data frame, updates a size of the non-allocated portion of the macro-diversity region based on the allocated burst, and repeats selecting, allocating, and updating until none of the predetermined burst sizes will fit in the non-allocated portion of the macro-diversity region; and an output configured to communicate the allocation of data bursts.

Other features and advantages of the present invention should be apparent after reviewing the following detailed description and accompanying drawings which illustrate, by way of example, aspects of the invention.

BRIEF DESCRIPTION OF THE DRAWINGS

These and other aspects, advantages and details of the present invention, both as to its structure and operation, may be gleaned in part by a study of the accompanying exemplary drawings, in which like reference numerals refer to like parts. The drawings are not necessarily to scale, emphasis instead being placed upon illustrating the principles of the invention.

DETAILED DESCRIPTION

Figure 1:
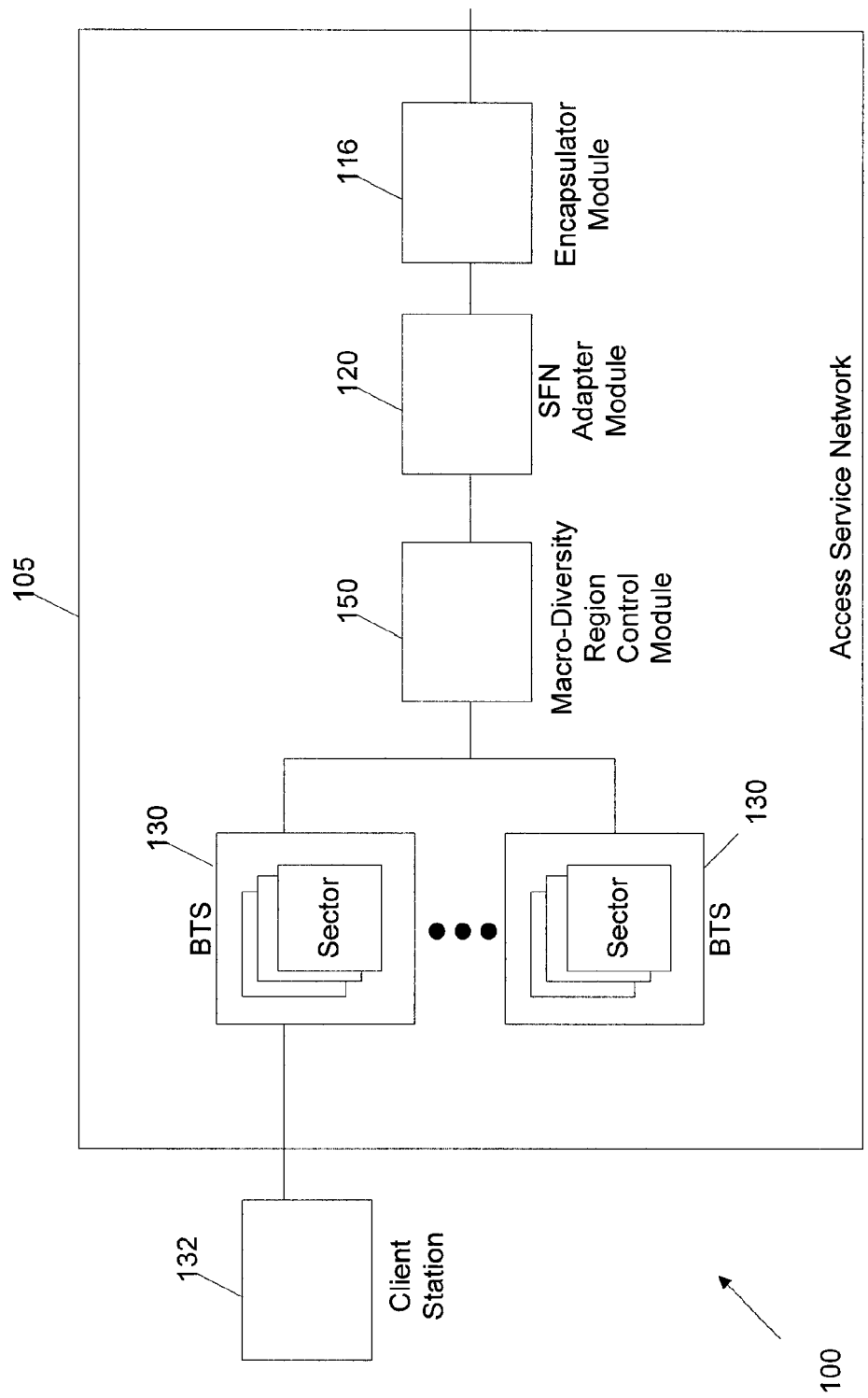
FIG. 1 is a block diagram of an example network in which a data frame comprising a macro-diversity region may be used for broadcasting data to a plurality of client stations in accordance with an embodiment.

Certain embodiments as disclosed herein provide for methods and systems for communication over a broadband wireless air interface. After reading this description it will become apparent how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Methods, apparatuses, and techniques are described for allocating data bursts to a macro-diversity region of a downlink communication signal transmitted from multiple base stations, or base transceiver stations, (BTS), such as, for example, BTSs in a single frequency network (SFN). As is known to those of skill in the art, a SFN refers to a network capable of simultaneously broadcasting the same signal (i.e., the same content) over the same frequency channel from multiple transmitters. Further, as used herein the term "macro-diversity region" refers to a portion of a data frame useable for broadcasting information. Exemplary macro-diversity regions include, for example, a Multicast and Broadcast Services (MBS) region of an Orthogonal Frequency Division Multiple Access (OFDMA) data frame, such as, for example, an OFDMA data frame in accordance with the Worldwide Interoperability for Microwave Access (WiMAX) standards (i.e., the Institute for Electrical and Electronics Engineers (IEEE) 802.16 Working Group on Broadband Wireless Access Standards). A further description of an exemplary macro-diversity region of a data frame is presented below. Further, as used herein the terms macro-diversity region and broadcast region are interchangeable.

In one embodiment, data bursts are allocated to the macro-diversity region to broadcast data using the macro-diversity region of a data frame. As used herein, the term data burst refers to a consecutive group of data bits or data packets. In accordance with one embodiment, data bursts are allocated to the macro-diversity region in a manner that optimizes the throughput and overall coding gain of the data transmitted via the macro-diversity region. For example, because there is overhead associated with each individual data burst, decreasing the number of data bursts may decrease the total amount of overhead associated with the macro-diversity region. Decreasing the required overhead, accordingly increases the amount of data that may be transmitted by the data frame and thus the overall throughput (i.e., transmitted data) may be increased. Thus, in accordance with one embodiment, larger data bursts are typically preferred over smaller bursts in allocating data bursts to a macro-diversity region of a data frame. A further description of exemplary methods and systems for allocating data bursts to a data frame is provided in more detail below.

In one embodiment, in allocating data bursts to the macro-diversity region, the size for each data burst may be selected from a set of predetermined data burst sizes. These predetermined data burst sizes may be selected, for example, based in part on their coding gain performance. For example, a data burst size of 4800 bits may have a desired, or optimal, coding gain and be the largest of the predetermined burst sizes. Therefore, in such an embodiment, data bursts may be allocated to the macro-diversity region in a manner such that as many data bursts with a size of 4800 bits are allocated to the macro-diversity region as will fit within the macro-diversity region. When the remaining portion of the macro-diversity region is not large enough to fit any additional 4800 bit data bursts, then a smaller data burst size is selected from the set of predetermined burst sizes and as many of data bursts at this new selected burst size are allocated to the macro-diversity region as will fit. This process may then repeat until the remaining non-allocated portion of the macro-diversity region is smaller than the smallest predetermined burst size (e.g., 144 bits), after which this remaining portion may be left empty, nulls may be allocated to it, or smaller sized data bursts may be allocated to it as will be described in further detail below.

In one embodiment, the predetermined burst sizes include a 4800 bit burst size, a 3840 bit burst size, a 2800 bit burst size, a 1920 bit burst size, a 960 bit burst size, a 480 bit burst size, a 384 bit burst size, a 288 bit burst size, a 192 bit burst size, and a 144 bit burst size. In this embodiment, the largest burst size, 4800 bit, is first selected and 4800 bit data bursts are allocated to the macro-diversity region until the remaining portion of the macro-diversity region is less that 4800 bits. Then, the next largest burst size that will fit in the remaining portion of the macro-diversity region is selected. This process continues until the macro-diversity region is filled or the remaining non-allocated portion of the macro-diversity region is smaller that any of the predetermined burst sizes (i.e., less than 144 bits). It should be noted that these burst sizes are exemplary only, and in other embodiments other data burst sizes may be selected as the predetermined available burst sizes based upon desired characteristics obtained using the data burst size, for example achieving a desired coding gain using the selected data burst size and/or other factors.

FIG. 1 is a block diagram of an example network 100 in which a data frame comprising a macro-diversity region may be used for broadcasting data to a plurality of client stations 132 in accordance with an embodiment. In the example illustrated in FIG. 1, the network 100 includes an access service network 105 and at least one client station 132. In one embodiment, the client station 132 includes a receiver that receives a data frame transmitted from at least one BTS 130 in the access service network 105. Typically, the client station 132 can play back the received data for observation by a user. Optionally, the client station 132 may also record the received data.

As noted, the access service network 105 includes at least one BTS 130. In the example illustrated in FIG. 1, the access service network 105 includes a plurality of BTSs 130. In one embodiment, BTSs 130 may include an antenna system that is sectorized into one or more sectors with each sector transmitting and receiving signals within a corresponding coverage area, wherein the coverage area of the sector may be the same or less than the total coverage area of the BTS.

The access service network 105 may also include an encapsulator module 116, a single frequency network (SFN) adapter module 120, and a macro-diversity region control module 150. In one embodiment, the macro-diversity region control module 150 can be a Multicast and Broadcast Services (MBS) controller capable of describing to the BTSs an MBS region for broadcasting data via a WiMAX OFDMA data frame. An exemplary macro-diversity region control module 150 will be described in more detail below.

In one embodiment, the encapsulator module 116 receives Internet Protocol (IP) packets from a network (not shown). The encapsulator module 116 encapsulates the IP packets and outputs transport packets, such as Motion Picture Expert Group 2 (MPEG-2) transport packets. As used herein, a transport packet refers to any type of data packet useable for transporting data, and may use any type of format or protocol in transporting the data. In another embodiment, the encapsulator module 116 can also perform time slicing operation in accordance with the European Telecommunications Standards Institute (ETSI) standard for Digital Video Broadcast-Handheld (DVB-H) along with performing multi-protocol encapsulation with forward error correction (MPE-FEC). Additionally, in an embodiment, the encapsulator module 116 may wrap the packets (e.g., transport packets) with an IP header prior to outputting the wrapped packets.

In one embodiment, the output of the encapsulator module 116 is communicated to the single frequency network (SFN) adapter module 120 that receives the MPEG-2 transport packets and inserts time stamping information. In one embodiment, the packets outputted to the SFN adapter module 120 may be transmitted to the SFN adapter module 120 over a network, such as an Ethernet network. In one embodiment, the time stamping information added to the MPEG-2 transport packets enables individual BTSs 130 to be time synchronized to each other. The SFN adapter module 120 may further combine multiple received MPEG-2 transport packets into a larger frame (referred to herein as a "mega-frame") for transmission by the BTSs 130. In one embodiment, the output of the SFN module 120 is communicated to the macro-diversity region control module 150 that receives the time stamped MPEG-2 data (e.g., the received MPEG-2 transport packets or mega-frame) and defines a macro-diversity region in a data frame. For example, the macro-diversity region defined can be a Multicast Broadcast Services (MBS) region of an OFDMA data frame, such as, for example, an OFDMA data frame in accordance with the WiMAX standards. A further description of the macro-diversity region is provided below.

Information regarding the macro-diversity region may then be communicated to the BTS's 130. The BTSs 130 may then build data frames including the defined macro-diversity region using the information received from the macro-diversity region control module 150. These data frames may be, for example, OFDMA data frames in accordance with the WiMAX standards. The BTSs 130 may then broadcast the OFDMA data frames including the macro-diversity region. Further, the BTSs 130 may be synchronized so that the macro-diversity regions transmitted by the BTSs 130 are identical and synchronized. It should be noted that although in this embodiment, each BTS 130 simultaneously broadcasts a common macro-diversity region, the remainder of the data frames transmitted by each BTS 130 need not include common data. A further description of an exemplary data frame comprising a macro-diversity region is presented below.

Figure 2:
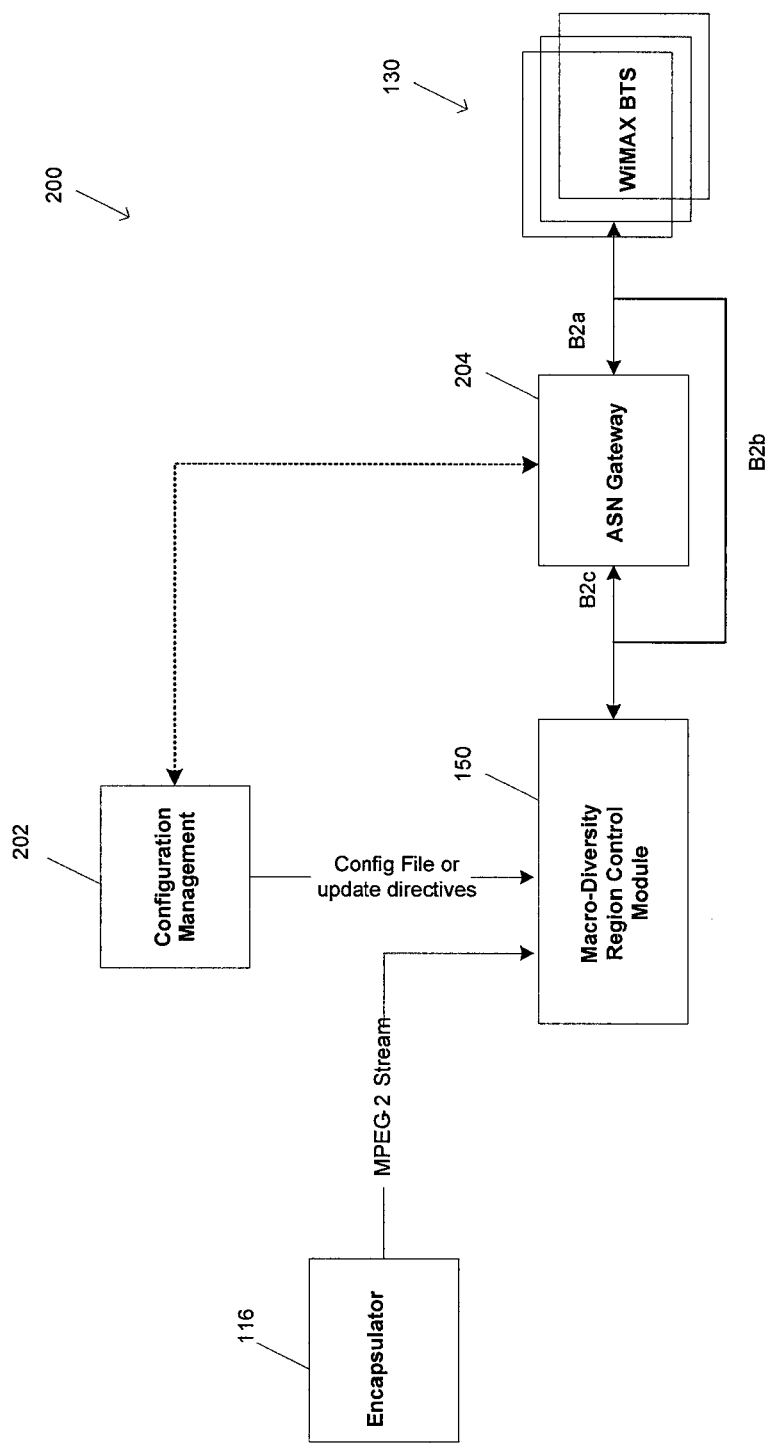
FIG. 2 is a block diagram of another example network in which a data frame comprising a macro-diversity region may be used for broadcasting data.

FIG. 2 is a block diagram of another example network 200 in which a data frame comprising a macro-diversity region may be used for broadcasting data. In the example of FIG. 2, a macro-diversity region control module 150 receives packets (e.g., MPEG-2 transport stream packets) from an encapsulator 116 such as an IP encapsulator (for ease of explanation, the encapsulator 116 can be referred to as an IP encapsulator). As with the embodiment of FIG. 1, in an embodiment IP encapsulator 116 may wrap the packets (e.g., MPEG-2 transport stream packets) with an IP header and transmit the wrapped packets to the macro-diversity region control module 150 over a network, such as, an Ethernet network. The macro-diversity region control module 150 may also receive configuration information from a configuration management module 202. The configuration information can include, for example, a list of parameters used by the macro-diversity region control module 150 specifying the incoming traffic from the IP encapsulator 116, and parameters for outgoing traffic, as well as other management information.

The macro-diversity region control module 150 builds the macro-diversity region and communicates the macro-diversity region to an access service network gateway (ASN-GW) 204. In this embodiment, the macro-diversity region control module 150 delivers the macro-diversity region information to the ASN-GW 204 and the ASN-GW 204 distributes this information to at least one BTS 130. In another embodiment, the macro-diversity region control module 150 builds the macro-diversity region and communicates the macro-diversity region directly to the BTSs 130 (i.e., the macro-diversity region information from the macro-diversity region control module 150 bypasses the ASN Gateway 204 or, for example, no ASN gateway 204 is included in network 200). Additionally, in an embodiment, the macro-diversity control module 150 time stamps the information regarding the macro-diversity region prior to providing the macro-diversity region to the ASN-GW or BTSs 130. Time stamping the information regarding the macro-diversity region may used by the BTSs 130 in synchronizing the transmission of the macro-diversity region by the BTSs 130. For example, in an embodiment each BTS 130 in the network 200 may simultaneously transmit a particular macro-diversity region at a time specified by the time stamp.

As in the embodiment of FIG. 1, the BTSs 130 receive the information regarding the macro-diversity region communicated by the macro-diversity region control module 150 and use the received information to build data frames comprising the macro-diversity region. Further, as in the embodiment of FIG. 1, the BTSs 130 may be synchronized so that each BTS 130 simultaneously transmits a common macro-diversity region. As noted above, in an embodiment, the macro-diversity control module 150 may provide a time stamp for each macro-diversity region that the BTSs 130 may use in synchronizing transmission of the macro-diversity control module (e.g., each BTS 130 may transmit the macro-diversity region at the time specified by the time stamp). Additionally, as with the embodiment of FIG. 1, although each BTS 130 transmits a data frame comprising a common macro-diversity region, the remainder of the data frames transmitted by each BTS 130 need not (and typically does not) include common data. A further description of an exemplary data frame is presented below.

In the example of FIG. 2, the macro-diversity region control module 150 is illustrated as a separate entity. Alternatively, the macro-diversity region control module 150 can be co-located with another entity, such as the ASN gateway 204, or IP encapsulator 116. Further, referring back to FIG. 1, the macro-diversity region control module 150 may be co-located with the SFN adapter module 120 in an embodiment. The choice of the entity on which the macro-diversity region control module 150 functionality resides can vary depending on, for example the infrastructure vendor. In addition, the functionality can be distributed across multiple entities.

Figure 3:
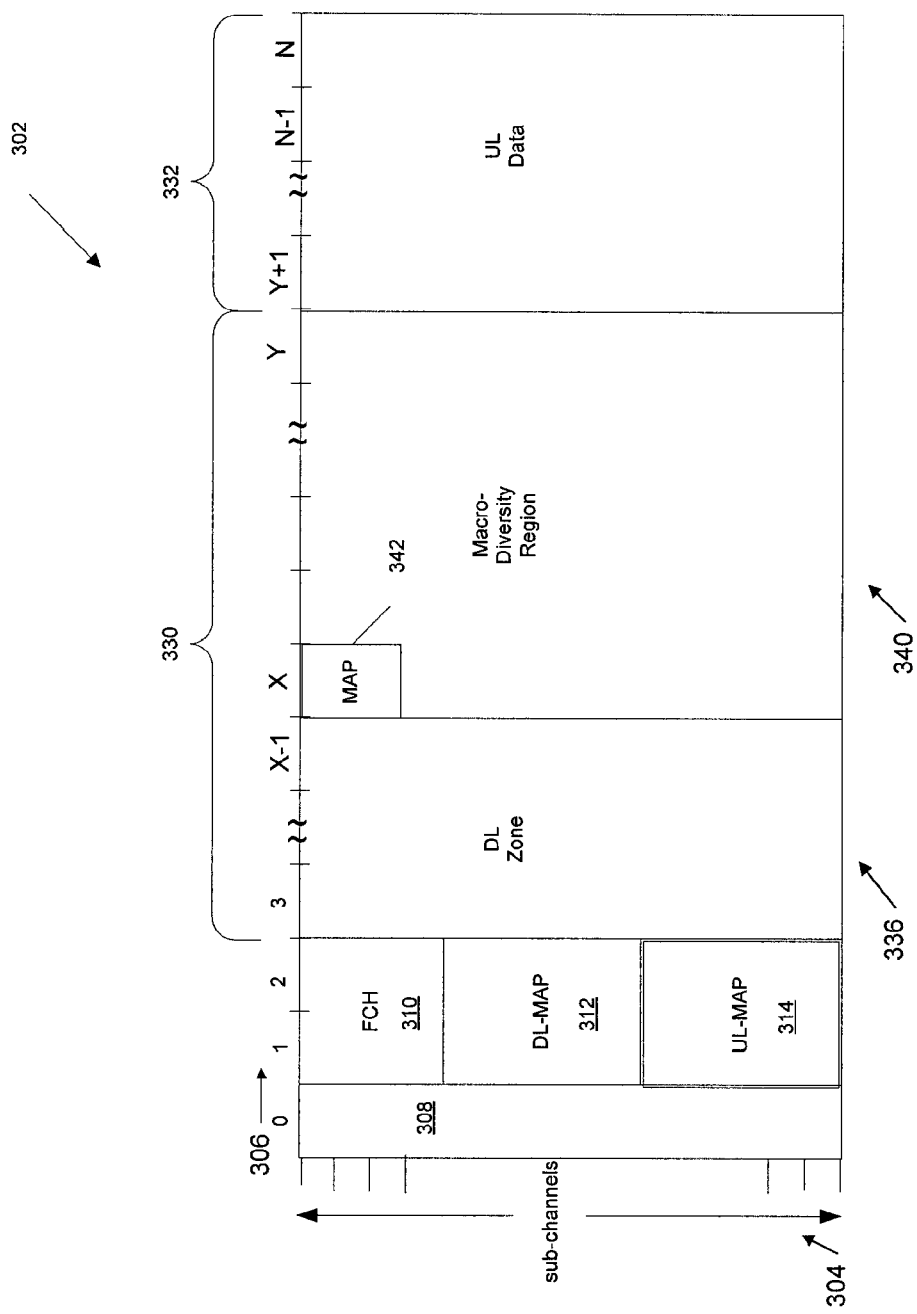
FIG. 3 is a diagram illustrating an example frame structure that can be used to transmit data between a BTS and a subscriber station.

FIG. 3 is a diagram illustrating an example data frame structure that can be used to transmit data between a BTS 130 and a subscriber station 132. As illustrated in the example of FIG. 3, the data frame 302 structure can be divided into multiple sub-channels 304 (along the vertical axis in FIG. 3), with each sub-channel using a carrier frequency that is orthogonal to the carrier frequencies of other sub-channels. The frame 302 is also divided in time into symbol periods 306 (along the horizontal axis in FIG. 3). Each sub-channel 304 during a symbol period comprises a symbol. A symbol can be any type of signal modulation to transmit information. As illustrated in FIG. 3, in a data frame 302, data may be carried by symbols on each of the sub-channel carrier frequencies 304 simultaneously during individual symbol periods 306. Further, a group of consecutive symbols may be treated as a symbol groups, such that the frame 302 is split into a fixed number of symbol groups each consisting of a particular number (e.g., 2, 4, etc.) of consecutive symbols.

In the example of FIG. 3, the data frame 302 includes a preamble 308 during symbol period 0. During symbol periods 1 and 2, the data frame 302 includes a frame control header (FCH) 310 and a downlink map (DL-MAP) 312 and uplink map (UL-MAP) 314. Generally, the FCH 310 includes information about the frame 302 configuration, such as coding schemes, message lengths, usable sub-channels, and the like. The downlink and uplink maps 312 and 314 include information about the location of downlink and uplink content within the data frame 302. The data frame 302 includes a downlink region 330 and an uplink region 332 defined by the downlink and uplink maps. Included in the downlink region 330 is a downlink data region 336 and a macro-diversity region 340. While FIG. 3 illustrates an example of the macro-diversity region 340 being located at the end of the downlink region 330, in other embodiments the macro-diversity region 340 can be located at other positions in the downlink region 330. In addition, the macro-diversity region 340 does not need to be continuous, but can be separated into multiple regions within the downlink region 330.

The macro-diversity region 340 includes a macro-diversity region Map 342 that defines the size and content of the macro-diversity region 340. In one embodiment, the macro-diversity map 342 rather than defining the macro-diversity region 340 for the data frame 302 the Map 342 resides in, the macro-diversity region Map 342 defines the size and content of a macro-diversity region 340 in a subsequent data frame 302 of data. For example, the macro-diversity Map 342 may define the size and content of a macro-diversity region in the next data frame in time (i.e., the frame sent immediately after the data frame in which the map 342 resides), or the second data frame 302 following the current frame, or other subsequent data frames of data.

Figure 4:
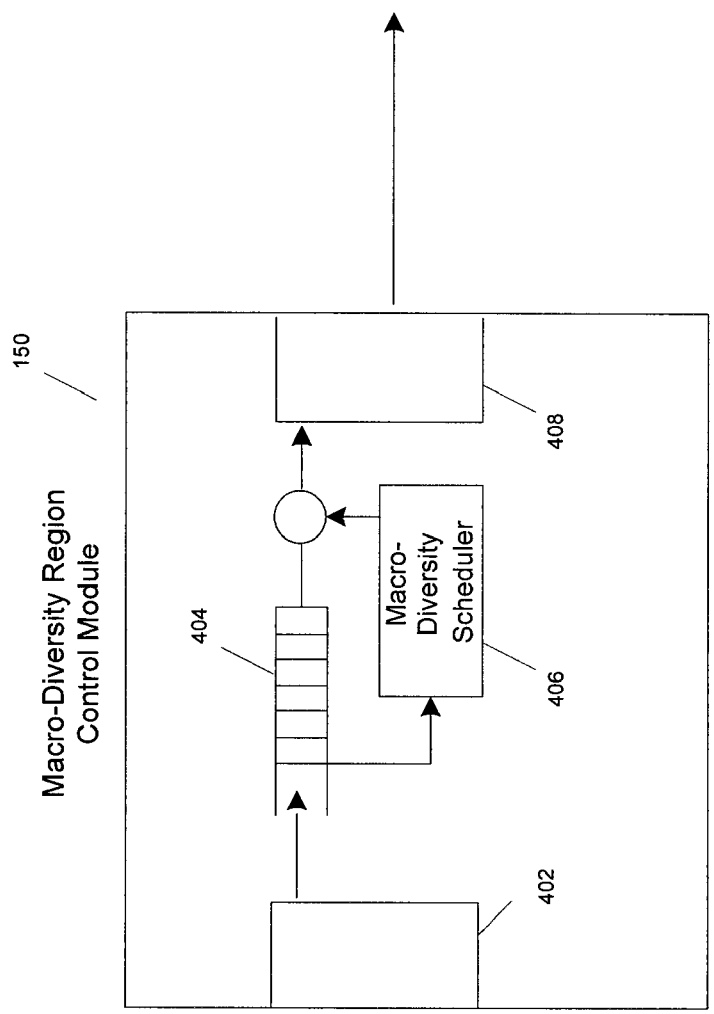
FIG. 4 is a block diagram of an embodiment of a macro-diversity region control module.

FIG. 4 is a block diagram of an embodiment of a macro-diversity region control module 150. As shown in the example of FIG. 4, the macro-diversity region control module 150 includes an input 402 that receives data, such as MPEG-2 transport stream data packets or mega-frames. As noted above, in an embodiment the data received by the macro-diversity control module 150 may be wrapped in an IP header and be received via a network, such as, an Ethernet network. The input 402 may be, for example, an interface implemented in software, hardware, or any combination thereof. The input 402 communicates the received data to a memory module 404 that receives and temporarily stores the data. The memory module 404 can be many different types of memory devices, such as for example, volatile or non-volatile memory modules, optical or magnetic storage devices, such as hard and floppy disk drives, CD-ROM drives, and magnetic tape drives.

The macro-diversity region control module 150 also includes a macro-diversity scheduler 406. The macro-diversity scheduler 406 selects a burst size from among a set of a plurality of predetermined burst sizes. In one embodiment, the selected burst size is the largest burst size that fits within the non-allocated portion of a macro-diversity region of a data frame. The scheduler 406 populates the selected burst size with at least a portion of the received data from the memory module 404 and allocates the populated selected burst to the macro-diversity region. The scheduler 406 then updates the size of the non-allocated portion of the macro-diversity region based on the allocated burst. The macro-diversity scheduler 406 repeats selecting, populating, allocating, and updating until none of the predetermined burst sizes will fit in the non-allocated portion of the macro-diversity region. The macro-diversity scheduler 406 communicates the populated bursts to an output 408 that communicates the macro-diversity region directly to at least one base station 130. The output 408 may be, for example, an interface implemented in software, hardware, or any combination thereof. Further, output 408 may be capable of converting the information regarding how to build the macro-diversity region to a protocol prior to communicating the macro-diversity region information. In another embodiment, the macro-diversity scheduler 406 communicates the macro-diversity region information via output 408 to an ASN-GW 204 and the ASN-GW 204 distributes this information to at least one BTS 130.

The macro-diversity scheduler 406 can be implemented with a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Figure 5:
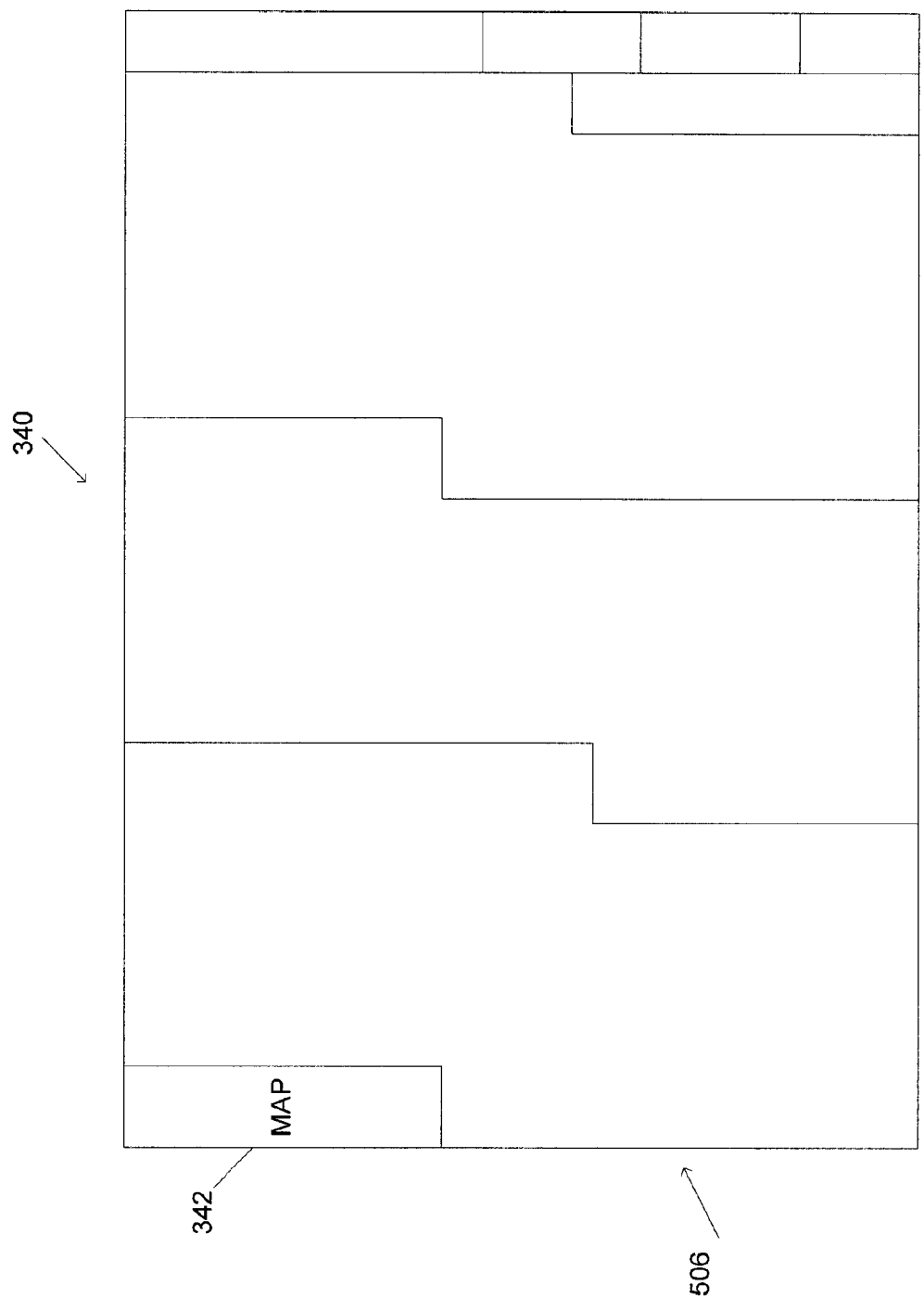
FIG. 5 is a block diagram of a macro-diversity region of a frame using Hybrid Automatic Request (HARQ) allocations.

FIG. 5 is a block diagram of a macro-diversity region of a frame using Hybrid Automatic Request (HARQ) allocations. FIG. 5 will be discussed with reference to the above-discussed FIG. 3. As shown in FIG. 5, the macro-diversity region 340 includes a macro-diversity region Map 342 and a plurality of data burst allocations 506. Each of these allocated data bursts 506 may also be referred to herein as a HARQ packet or HARQ sub-burst. In one embodiment, the size of each allocated data bursts 506 is selected from a set of predetermined sizes. For example, the size of each allocated data bursts 506 may be selected from the set of sizes of 4800, 3840, 2880, 1920, 960, 480, 384, 288, 192, 144 bits. It is noted that the entire portion of the macro-diversity region 340 that is not occupied by the Map 342, including the symbol periods 306 for the sub-channel carrier frequencies 304 immediately below the MAP 342, can be allocated to data bursts. In other words, a single symbol period may include some sub-channels that carry Map 342 information and other sub-channels that carry data.

Larger burst sizes generally provide higher error protection. As noted above, in an embodiment, macro-diversity region Map 342 describes the macro-diversity region 340 including, for example, the size and location of the data burst allocations 506 within the macro-diversity region 340. Accordingly, in an embodiment, the size of the macro-diversity region Map 342 may depend, in part, on the number of data bursts 506 allocated to the macro-diversity region 340 of the data frame 302. Thus, using larger data burst sizes may also reduce the size of the macro-diversity region Map 342 and increase data throughput.

In an embodiment, a constant amount of overhead is introduced for each data burst 506 allocated to the macro-diversity region 340. For example, in one embodiment there are 16 error detection bits, such as Cyclic Redundancy Check (CRC) bits, of overhead and one Information Element (IE) that is 56 bits added to the macro-diversity Map 342 for each data burst 506 allocated to the macro-diversity region 340. Thus, in an embodiment, the macro-diversity region control module 150 can select larger and accordingly less data bursts 506 for the macro-diversity region to minimize the amount overhead and as such increase data throughput. In one example, the predetermined set of data burst 506 sizes are 144, 192, 288, 384, 480, 960, 1920, 2880, 3840, and 4800 bits. The data bursts 506 can be selected from the predetermined set of sizes to fill, or nearly fill, a given macro-diversity region 340. It should be noted that this is but one example, and in other embodiments the amount of overhead introduced for each data burst may be variable.

As noted, larger HARQ burst sizes generally provide improved error protection. In general, it is noted that: (1) for large data bursts 506, i.e., data burst greater than or equal to 960 bits, the coding performance is very good and only increases slightly with increases in the data burst 506 size; and (2) for small data bursts 506, i.e., data burst less than 960 bits, the coding performance increases rapidly with increases in the burst size. While it is generally preferred to use larger data burst sizes 506, this needs to be balanced against coding performance fluctuations caused by using different data burst 506 sizes.

In accordance with one embodiment, data bursts 506 are allocated to the macro-diversity region 340 by the macro-diversity region control module 150 by selecting the largest size data burst from a set of predetermined data burst sizes and determining how many, if any, of the selected size data burst will fit in the macro-diversity region 340. A Map 342 of the macro-diversity region 340 is updated and the data bursts are allocated to the macro-diversity region 340. Then, the next largest sized data burst is selected and the process continued until the macro-diversity region 340 is full, or the non-allocated portion of the macro-diversity region is smaller than the smallest predetermined data burst size. Any remaining non-allocated region of the macro-diversity region can be left empty, or filled with null data, or other predetermined data.

In an embodiment, macro-diversity region 340 may be an MBS region in accordance with WiMAX standards included in an OFDMA data frame. Typically, in an MBS region 340 using HARQ data bursts, the sub-channels 304 located directly below the Map 342 are required to be left empty or unused. As illustrated, however, in FIG. 5, in the presently described embodiment, the sub-channels located directly below Map 342 may be used for transmitting data bursts 506. As noted above, in an embodiment, Map 342 may not describe the data burst allocations to the macro-diversity region 340 in which the Map 342 is located, but instead describe a subsequent macro-diversity region 340, such as for example, the next macro-diversity region in time, the second macro-diversity region 340 later in time, or some other subsequent macro-diversity region 340. In an embodiment, this Map 342, in addition to describing the allocations to the subsequent macro-diversity region 340, may also include information describing the size of the Map 342 (e.g., in terms of sub-carriers and symbols or symbol groups) that will be included in this subsequent macro-diversity region 340. Thus, by knowing the size of the Map 342 allocated to the subsequent data frame, and that the first data burst will be allocated immediately below the Map 342, the location of this first data burst may be identifiable. Accordingly, by including in the Map 342 information regarding the size of the Map 342 allocated to a subsequent data frame along with information regarding the data burst allocations to the macro-diversity region 340, the sub-carriers 304 located immediately below the Map 342 of the subsequent macro-diversity region 340 may be useable for data bursts.

Figure 6C:
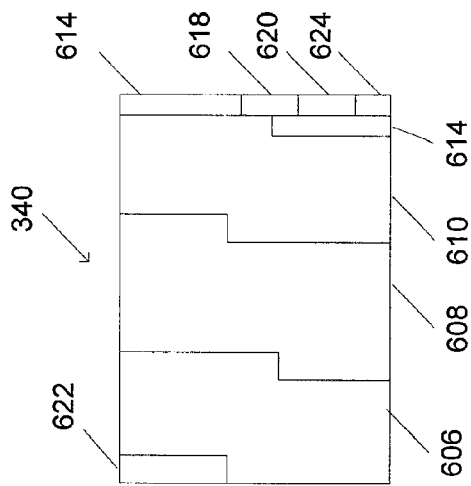
FIGS. 6A-C is a diagram illustrating an example technique of filling a macro-diversity region in a data frame.
Figure 6B:
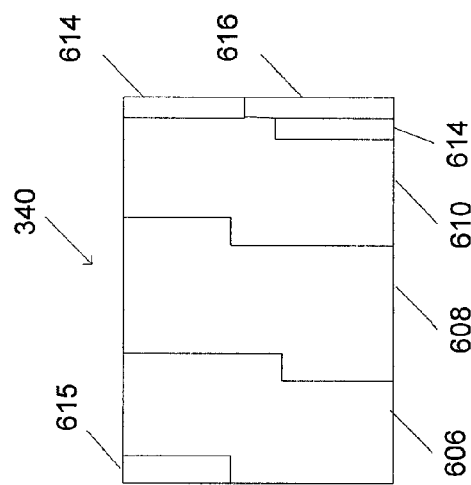
Figure 6A:
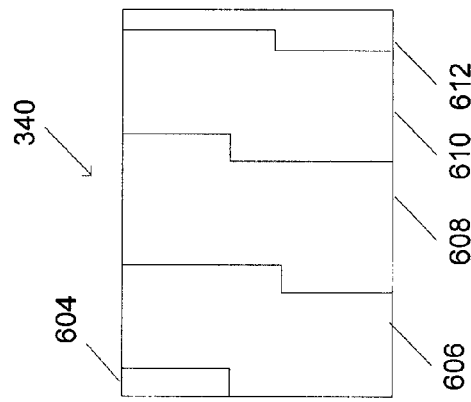

An example technique of filling a macro-diversity region 340 is shown in FIGS. 6A-C. As shown in FIG. 6A, the technique starts with the macro-diversity region control module 150 selecting the largest data burst size from a set of predetermined data burst sizes. The macro-diversity region control module 150 then determines the number, if any, of the selected data burst size will fit within the macro-diversity region 340. If the selected data burst size will not fit within the macro-diversity region then the next largest size data burst from the set of predetermined data burst sizes is selected.

In the example of FIG. 6A, three of the selected data burst sizes 606, 608, and 610 will fit within the macro-diversity region 340. The macro-diversity region control module 150 determines the amount of information that is needed to identify the data bursts 606, 608, and 610 within the macro-diversity region 340 and generates a Map 604. Then, the macro-diversity region control module 150 determines if the Map 604 and the three selected data burst 606, 608, and 610 will fit within the macro-diversity region 340. If the Map 704 and three selected data bursts 606, 608, and 610 do not fit in the macro-diversity region 340 the macro-diversity region control module 150 removes one of the selected data bursts 606, 608, and 612 and updates the Map 604. If the Map 604 and the three selected data bursts 606, 608 and 610 do fit, such as in the example illustrated in FIG. 6A, then the macro-diversity region control module 150 allocates the selected data bursts (i.e., data bursts 606, 608, and 610), and the Map 604 to the macro-diversity region 340. The macro-diversity region control module 150 then determines the size of non-allocated region 612 that remains in the macro-diversity region 340.

The macro-diversity region control module 150 then selects the next largest data burst size from the set of predetermined data burst sizes. The macro-diversity region control module 150 then determines the number, if any, of the selected data burst size that will fit within the non-allocated region 612 of the macro-diversity region 340. If the selected data burst size will not fit within the macro-diversity region then the next largest size data burst size from the set of predetermined data burst sizes is selected.

In the example of FIG. 6B, one of the selected data burst size 614 will fit within the non-allocated region 612 of the macro-diversity region 340. The macro-diversity region control module 150 determines the amount of information that is needed to identify the data burst 614 within the macro-diversity region 340 and generates an updated Map 615. Then, the macro-diversity region control module 150 determines if the updated Map 615, the previously allocated data bursts 606, 608, and 610, and the selected data burst 614 will fit within the macro-diversity region 340. If the updated Map 615, the previously allocated data bursts 606, 608, and 610, and selected data burst 614 do not fit in the macro-diversity region 340 the macro-diversity region control module 150 removes the selected data burst 614 and re-updates the Map 615. The macro-diversity region control module 150 then selects the next largest data burst size from the set of predetermined data burst sizes and repeats the process of determining if the data burst size fits in the non-allocated region.

If the updated Map 615, the previously allocated data bursts 606, 608, and 610, and selected data burst 614 do fit in the macro-diversity region 340, the example illustrated in FIG. 6B, then the macro-diversity region control module 150 allocates the selected data burst 614 and the updated Map 615 to the macro-diversity region 340. Note that allocating the updated Map 615 may cause the previously allocated data bursts 606, 608, and 610 to be assigned to different symbols, or symbol groups in the macro-diversity region 340. The macro-diversity region control module 150 then determines the size of non-allocated region 616 that remains in the macro-diversity region 340.

The macro-diversity region control module 150 then continues the technique by selecting the next largest data burst size from the set of predetermined data burst sizes. The macro-diversity region control module 150 then determines the number, if any, of the selected data burst size will fit within the non-allocated region 616 of the macro-diversity region 340. If the selected data burst size will not fit within the macro-diversity region then the next largest size data burst from the set of predetermined data burst sizes is selected and repeats the process of determining if the data burst size fits in the non-allocated region.

In the example of FIG. 6C, two of the selected data burst sizes 618 and 620 will fit within the non-allocated region 616 of the macro-diversity region 340. The macro-diversity region control module 150 determines the amount of information that is needed to identify the data bursts 618 and 620 within the macro-diversity region 340 and generates an updated Map 622. Then, the macro-diversity region control module 150 determines if the updated Map 622, the previously allocated data bursts 606, 608, 610, and 614, and the selected data bursts 618 and 620 will fit within the macro-diversity region 340. If the updated Map 622, the previously allocated data bursts 606, 608, 610, and 614, and selected data bursts 618 and 620 do not fit in the macro-diversity region 340 the macro-diversity region control module 150 removes one of the selected data bursts 618 and 620 and re-updates the Map 622. The macro-diversity region control module then determines if the updated Map 622 and data burst fit and if so allocates the updated Map 622 and data burst to the macro-diversity region 340.

If the updated Map 622, the previously allocated data bursts 606, 608, 610, and 614, and selected data bursts 618 and 620 do fit in the macro-diversity region 340, the example illustrated in FIG. 6C, then the macro-diversity region control module 150 allocates the selected data bursts 618 and 620 and the updated Map 622 to the macro-diversity region 340. Note that the new allocation may assign different symbols to the previously allocated data bursts. The macro-diversity region control module 150 then determines the size of non-allocated region 624 that remains in the macro-diversity region 340.

The above process continues until none of the predetermined data burst sizes will fit within the non-allocated region of the macro-diversity region 340. For example, in FIG. 6C, none of the predetermined data burst sizes will fit within the non-allocated region 624 of the macro-diversity region 340. In one embodiment, the non-allocated region 624 is left empty. In another embodiment, the non-allocated region 624 is filled with null data packets, or other predetermined data.

As noted above, in an embodiment, the Map 622 may not describe the data burst allocations to the macro-diversity region 340 in which the Map 622 is located, but instead describe a subsequent macro-diversity region 340, such as for example, the next macro-diversity region in time, the second macro-diversity region 340 later in time, or some other subsequent macro-diversity region 340. In an embodiment, this Map 622, in addition to describing the allocations to the subsequent macro-diversity region 340, may also include information describing the size of the Map that will be included in the subsequent macro-diversity region 340.

Figure 7:
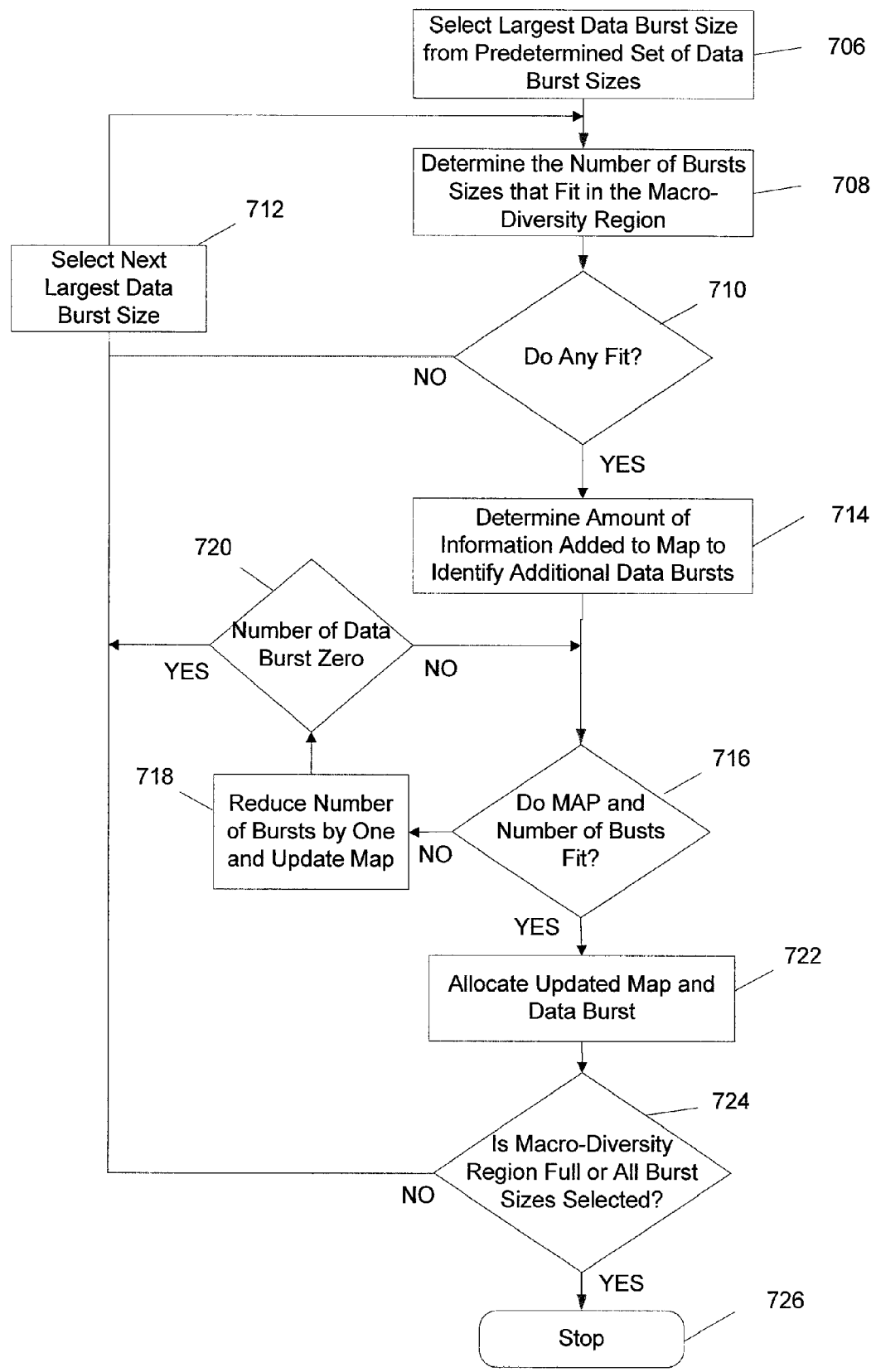
FIG. 7 is a flow chart illustrating aspects of a technique for allocating data bursts to a macro-diversity region.

FIG. 7 is a flow chart illustrating aspects of a technique for allocating data bursts to a macro-diversity region as illustrated in FIGS. 6A-C. Flow begins in block 706 where a macro-diversity control module selects the largest data burst size in a predetermined set of data bursts. Then, in block 708, the macro-diversity region control module determines the number of data bursts of the selected data burst size that fit within the macro-diversity region.

Flow continues to block 710 where the macro-diversity region control module determines if any data burst(s) of the selected size will fit in the macro-diversity region. If no data burst of the selected size fit then flow continues to block 712 where the next largest data burst size is selected. If, in block 710 it is determined that at least one data burst of the selected size fits, flow continues to block 714. In block 714 the macro-diversity region control module determines an amount of data needed to be added to a Map of the macro-diversity region to identify the additional data bursts that are added to the macro-diversity region. Flow continues to block 716 where the macro-diversity control module determines if the remaining non-allocated portion of the macro-diversity region is large enough for both the additional data bursts and the additional information that needs to be added to update the Map. If the macro-diversity region is not large enough for both the additional data bursts and the additional information that needs to be added to update the Map flow continues to block 718. In block 718 the number of data bursts is reduced by one. Flow continues to block 720 and the macro-diversity region control module determines if the number of additional data burst is zero. If the umber of data burst is not zero flow continues to block 716 and the macro-diversity region control module determines if the updated Map and number of data burst fit in the non-allocated portion of the macro-diversity region. If in block 720 it is determined that the number of additional data bursts is zero, flow continues to block 712 and the next largest data burst is selected.

Returning to block 716, if the data bursts and information to update the Map fit in the non-allocated portion of the macro-diversity region, flow continues to block 722. In block 722 the macro-diversity region control module allocates the updated Map and the data burst along with any previously allocated data bursts to the macro-diversity region. Flow then continues to block 724 where it is determined if the macro-diversity region is full, or if all of the data burst sizes in the set of predetermined data burst sizes have been selected. If the macro-diversity region is not full and not all of the predetermined data burst sizes have been selected, flow continues to block 712 where the next data burst size is selected. Returning to block 724, if the macro-diversity region is full, or all of the data burst sizes have been selected flow continues to block 726 and flow stops. Using this technique, the structure of the macro-diversity region of the downlink frame, as well as the effective number of bits it will carry, can be determined.

It should be noted that the technique illustrated in FIGS. 6A-C, and 7 has been simplified for explanatory purposes and discusses a macro-diversity region 340 in which the map 604, 615, and 622 describes the macro-diversity region 340 in which the map 604, 615, and 622 resides. As noted above, in other embodiments, the map located in a macro-diversity region may be used to describe a subsequent macro-diversity region rather than the macro-diversity region in which the map resides. An explanation regarding how the technique discussed in FIGS. 6A-C and 7 may be extended to embodiments in which the map describes subsequent macro-diversity regions is discussed below.

As noted above, in an embodiment, the Map included in a macro-diversity region does not describe the data burst allocations to the macro-diversity region in which the Map is located, but instead describes a subsequent macro-diversity region, such as for example, the next macro-diversity region in time, the second macro-diversity region later in time, or some other subsequent macro-diversity region. For example, the techniques may perform a collective check of multiple macro-diversity regions. For example, when data is allocated to a current macro-diversity region, the Map that is updated or adjusted can be in the macro-diversity region of a previous data frame. Thus, as data burst are allocated to the current macro-diversity region and the Map is updated, the technique can be modified to check that the updated Map and data burst allocated in the previous macro-diversity region that carries the update Map still fit. If the updated Map and data burst allocation in the previous macro-diversity region no longer fit then, using the techniques described, the data allocation in the previous macro-diversity region can be adjusted. In one embodiment, if the data allocation and updated Map no longer fit in the previous macro-diversity region then data that was allocated to one of the data burst in the previous macro-diversity region is re-allocated to a later macro-diversity region. In another embodiment, if the data allocation and updated Map no longer fit in the previous macro-diversity region at least a portion of the data that was allocated to one of the data burst in the previous macro-diversity region is eliminated or not transmitted. For example, data included in the smallest data allocation can be eliminated.

Additionally, in yet another embodiment, the size and structure of the macro-diversity regions may remain constant over particular periods of time. For example, it may be known that during particular hours of the day the macro-diversity region will be used to broadcast content data (e.g., television or other audio/visual content) and that the amount of content data transmitted during these hours will fit a particular profile. For example, it may be known that during the hours of 7 am until 1 am the macro-diversity region will carry only content data of live television broadcasts in order to permit a larger portion of the data frame (e.g., the DL zone 336 and UL region 332 of the data frame 302 of FIG. 3) to be used for transmitting point to point traffic, such as, for example, voice telephony traffic. However, during the hours of 1 am to 7 am, the amount of point to point traffic may be less, and therefore, the size of the macro-diversity region expanded so that it may carry additional content data (e.g., movies or other content data that need not be transmitted in real time) during these hours.

In such an embodiment, the macro-diversity region sizes during these fixed times may be constant and the maps included in each macro-diversity region may be identical in size and structure. Further, in such, an embodiment, there may be a transition frame used when transitioning from one macro-diversity region size to another. For example, in the example, in which size of the macro-diversity region is constant between the hours of 7 am and 1 am and then changes to a different size that remains constant between the hours of 1 am and 7 am, the system may use a transition frame at the hours of 7 am and 1 am when transitioning between macro-diversity region sizes. The size of the macro-diversity region for this transition frame may be, for example, in between the two sizes. In an embodiment using transition frames, the method discussed above with reference to FIG. 7 may be used for scheduling data bursts in the transition frame.

In yet another embodiment, transition frames may be used when transitioning from one macro-diversity region size to another and the maps included in the macro-diversity region may be used for mapping a subsequent macro-diversity region. Thus, in such an embodiment, the map appearing in the macro-diversity region of the transition frame may map a macro-diversity region with the new size, while the map that maps the macro-diversity region of the transition frame may be included in a macro-diversity region prior to the transition frame. In such an embodiment, the size of the map to be transmitted in the macro-diversity region of the transition frame may be known as well as the size permitted for the map that maps the transition frame to be included in the prior frame. This information may then be used in allocating data bursts to the macro-diversity region of the transition frame using a method similar to that described above with reference to FIG. 7 while ensuring that the map for the transition frame does not exceed its permitted size.

Further, in yet another embodiment, the size of the macro-diversity region may be increased by plus or minus (.+−.) a predetermined number of symbol periods (e.g., one) during the regular course of transmitting data using the macro-diversity region. For example, referring back to FIG. 4, in an embodiment, data incoming to the macro-diversity region control module 150 may be buffered in memory module 404. If the amount of data buffered by memory module 404 exceeds a threshold, the macro-diversity scheduler 406, or some other processor in the system, may determine to increase the size of the macro-diversity region by a particular number of symbol period(s) (e.g., one symbol period). Or, if the amount of data buffered falls below a threshold, the size of the macro-diversity region may be decreased by the particular number of symbol period(s) (e.g., one symbol period). Further, in such an embodiment, a transition frame may be used when transitioning to the new macro-diversity region size. The size and structure of the macro-diversity region for the transition frame may be stored by the macro-diversity region control module in a memory (not shown). For example, the macro-diversity regions control module may store a table that provides the size and structure of the macro-diversity region of the transition frame based on, for example, the sizes of the initial and new macro-diversity regions. Further, in such an embodiment, data bursts may be allocated to the macro-diversity region of this transition frame using a method similar to that discussed above with reference to FIG. 7. Additionally, in embodiments in which the map describes a subsequent macro-diversity region, the procedure may be modified in a manner similar to that discussed above.

In accordance with another embodiment, HARQ data bursts 506 are allocated to the macro-diversity region 340 by the macro-diversity region control module 150 by selecting subgroups of data burst sizes from a set of predetermined data burst sizes. For example, the subgroups can be selected based upon the data bursts having similar coding performance. In one embodiment, three subgroups are used, a first subgroup comprising a data burst size of 4800 bits; a second subgroup comprising data burst sizes of 960, 1920, 2880, and 3840 bits; and a third subgroup comprising data burst sizes of 144, 192, 288, 384, 480 bits. In this embodiment, the macro-diversity control module 150 determines a number of data bursts from the first subgroup (4800 bits) that will fit in the macro diversity region 340 and allocates these data bursts to the macro-diversity region 340. The macro-diversity control module 150 then selects the largest data burst size that will fit in the non-allocated region of the macro diversity region 340 from the second subgroup (960, 1920, 2880, and 3840 bits) and allocates a data burst of this selected size to the macro-diversity region 340. Then, the macro-diversity control module 150 selects the largest data burst size from the third subgroup (144, 192, 288, 384, 480 bits) that will fit in the non-allocated region of the macro diversity region 340 and allocates as many data bursts of this selected size to the macro-diversity region 340 as will fit (i.e., one or two data bursts of this selected size).

Figure 8:
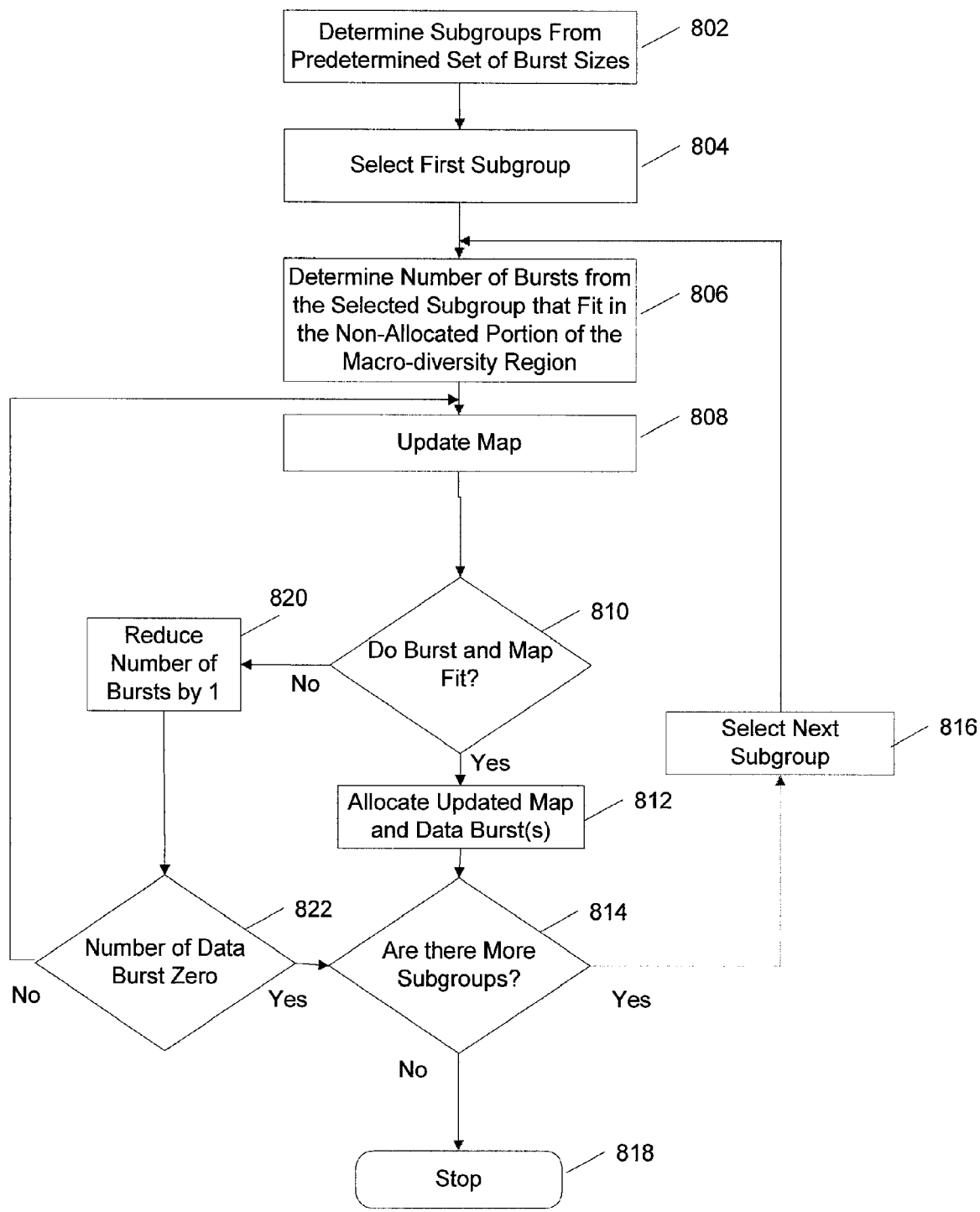
FIG. 8 is a flow chart of an example embodiment of allocating data bursts to a macro-diversity region based upon selecting subgroups of data burst sizes.

FIG. 8 is a flow chart of an example embodiment of allocating data bursts to a macro-diversity region based upon selecting subgroups of data burst sizes. Flow begins in block 802 where a set of predetermined data burst sizes are divided into subgroups. The subgroups can be determined by a network administrator or other network entity. The groupings can be based on, for example, that particular sizes have common characteristics such as similar coding gain, or error correction characteristics, or other types of characteristics. Flow continues to block 804 where a macro-diversity region control module selects a first subgroup. Flow continues to block 806 where the macro-diversity region control module determines how many bursts from the selected group will fit in a non-allocated portion of the macro-diversity region. In one embodiment, the largest data burst size in the group is checked first to see if it will fit, and if not, the next largest burst size is checked to see if it will fit, and so on. Once a burst size is located that will fit, the number of bursts of this size that will fit in the non-allocated portion is determined. Flow then continues to block 808 where a Map of the macro-diversity region is updated to reflect the addition of the data bursts to the macro-diversity region. Flow then continues to block 810.

In block 810 the macro-diversity region control module determines if the data burst(s) and updated Map will fit in the non-allocated macro-diversity region. If it is determined that the updated Map and data burst(s) do fit, flow continues to block 812. In block 812 the macro-diversity region control module allocates the updated Map and the data burst(s) to the macro-diversity region. Flow continues to block 814.

In block 814 the macro-diversity region control module determines if there are any more subgroups. If there are more subgroups flow continues to block 816 and the next subgroup is selected. If there are not any more subgroups flow continues to block 818 and flow stops.

Returning to block 810 if the macro-diversity region control module determines that the data burst(s) and Map do not fit in the macro-diversity region flow continues to block 820 where the number of burst(s) is reduced by one. Flow then continues to block 822 and the macro-diversity region control module determines if the number of data bursts is not zero flow continues to block 808 and the Map is updated. If the number of data bursts is zero flow continues to block 814 and flow continues as described above.

As with the embodiment of FIG. 7, the embodiment of FIG. 8 is a simplified embodiment provided for explanatory purposes. Further, the embodiment of FIG. 8 may be modified in a similar manner to that discussed above with reference to FIG. 7 for embodiments in which the map describes a macro-diversity region in a subsequent frame (rather than the region in which it resides), or the situation in which the size and structure of the macro-diversity region remains constant over periods of time with transition frames used when transition between macro-diversity regions of different sizes, or for combinations thereof (i.e., where transition frames are used and where the maps describe the structure of subsequent macro-diversity regions). For example, for embodiments in which the map describes subsequent macro-diversity regions, the method of FIG. 8 may be modified so that it collectively examines the impacts on both the prior and/or subsequent data frames when scheduling data bursts to a macro-diversity region.

Various implementations of the invention are realized in electronic hardware, computer software, or combinations of these technologies. Some implementations include one or more computer programs executed by one or more computing devices. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention.

Accordingly, the present invention is not limited to only those implementations described above. Those of skill in the art will appreciate that the various illustrative modules and method steps described in connection with the above described figures and the implementations disclosed herein can often be implemented as electronic hardware, software, firmware or combinations of the foregoing. To clearly illustrate this interchangeability of hardware and software, various illustrative modules and method steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module or step is for ease of description. Specific functions can be moved from one module or step to another without departing from the invention.

Moreover, the various illustrative modules and method steps described in connection with the implementations disclosed herein can be implemented or performed with a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the implementations disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Thus, it is to be understood that the description and drawings presented herein represent example implementations of the invention and are therefore representative of the subject matter which is broadly contemplated by the present invention. It is further understood that the scope of the present invention fully encompasses other implementations and that the scope of the present invention is accordingly limited by nothing other than the appended claims.

The invention claimed is:

1. A method of broadcasting content data in a macro-diversity region of a data frame, the method comprising:
   receiving a stream of transport packets;
   selecting at least one burst size, from amongst a set of a plurality of predetermined burst sizes;
   allocating one or more data bursts with the selected burst size to the macro-diversity region of the data frame, each data burst comprising at least a portion of the received stream of transport packets and wherein the at least one burst size is selected so as to minimize a number of data bursts allocated to the macro-diversity region; and
   communicating information regarding the allocation of the one or more data bursts to the macro-diversity region for broadcasting a data frame comprising the macro-diversity region from at least a first transmitter.

2. The method of claim 1, further comprising broadcasting from a second transmitter a signal including the data frame, such that the macro-diversity region of the data frames broadcasted by the first and second transmitters are synchronized.

3. The method of claim 2, wherein the macro-diversity region of the data frames transmitted from the first and second transmitter comprise identical data packets.

4. The method of claim 1, wherein selecting at least one burst size comprises selecting a largest burst size.

5. The method of claim 1, wherein the set of the plurality of predetermined burst sizes comprises one or more of a 4800 bit burst size, a 3840 bit burst size, a 2800 bit burst size, a 1920 bit burst size, a 960 bit burst size, a 480 bit burst size, a 384 bit burst size, a 288 bit burst size, a 192 bit burst size, and a 144 bit burst size.

6. The method of claim 1, further comprising:
   selecting a largest burst size from amongst the set of a plurality of predetermined burst sizes that is smaller than a remaining portion available in the macro-diversity region;
   updating the remaining portion available in the macro-diversity region based on the selected largest burst size; and
   repeating selecting and updating until none of the burst sizes is smaller than the remaining portion available in the macro-diversity region.

7. The method of claim 6, wherein when none of the burst sizes is smaller than the remaining portion available in the macro-diversity region the remaining portion of the macro-diversity region is left empty of data or filled with null packets.

8. The method of claim 1, wherein the information regarding the allocation of the one or more data bursts to the macro-diversity region comprises information regarding the allocation of data bursts in a previous macro-diversity region.

9. The method of claim 1, further comprising allocating a map to the macro-diversity region, wherein the map is updated when data bursts are allocated to the macro-diversity region.

10. A method, performed by a network, of generating a macro-diversity region in a data frame for transmission to a client station; the method comprising:
    identifying a plurality of sub-channels and a plurality of symbol periods, wherein a symbol period comprises a plurality of symbols, and wherein each symbol during an individual symbol period is associated with a different one of the plurality of sub-channels;
    generating a map information that includes information that describes data bursts and a size of a map in a subsequent macro-diversity region, wherein the map information is included in at least a first symbol during a first symbol period and wherein a data burst is included in at least a second symbol during the first symbol period.

11. The method of claim 10, wherein each of the plurality of sub-channels comprises a carrier frequency that is orthogonal to a carrier frequency of each of the other sub-channels.

12. The method of claim 10, wherein the information that describes data bursts and a size of the map in a subsequent macro-diversity region is used to identify a first data burst in the subsequent macro-diversity region.

13. The method of claim 10, wherein the map is included in a first symbol period of the macro-diversity region.

14. A method of broadcasting content data in a macro-diversity region of a data frame, the method comprising:
    encapsulating a plurality of transport packets, each transport packet comprising content data;
    selecting at least one burst size, from amongst a set of a plurality of predetermined burst sizes, and allocating one or more data bursts with the selected at least one burst size to the macro-diversity region of the data frame, each data burst comprising at least a portion of the encapsulated plurality of transport packets and wherein the at least one burst size is selected so as to minimize a number of data bursts allocated to the macro-diversity region; and
    broadcasting from each of at least a first and a second transmitter a signal including a data frame in which the selected at least one data burst was allocated, such that the signals broadcasted from the first and second transmitter are synchronized.

15. The method of claim 14, further comprising:

receiving a plurality of data packets comprising content data;

wherein encapsulating a plurality of transport packets, comprises:

encapsulating at least a portion of the data packets comprising content data into MPEG-2 transport packets.

* * * * *